US006421529B1

(12) United States Patent
Wing et al.

(10) Patent No.: US 6,421,529 B1
(45) Date of Patent: Jul. 16, 2002

(54) METHOD AND APPARATUS FOR THE DETECTION OF A REDUCTION IN CAPACITY OF A CDMA SYSTEM

(75) Inventors: Thomas E. Wing, Mendham, NJ (US); James J. Madon, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/333,009

(22) Filed: Jun. 15, 1999

(51) Int. Cl.[7] .......................... H04B 17/00; H04Q 7/20; H04M 15/00
(52) U.S. Cl. ...................... 455/67.7; 455/424; 455/561; 379/135; 379/136; 379/112.01
(58) Field of Search .................. 455/424, 423, 455/67.7, 67.1, 425, 63, 522, 69, 453, 450, 452, 560, 561; 379/111, 112.01, 133, 134, 136, 135

(56) References Cited

U.S. PATENT DOCUMENTS

| | | | |
|---|---|---|---|
| 5,245,629 A | 9/1993 | Hall | 455/522 |
| 5,280,472 A | 1/1994 | Gilhousen et al. | 370/335 |
| 5,475,861 A | 12/1995 | Hall | 455/422 |
| 5,570,373 A | 10/1996 | Eing | 455/423 |
| 5,732,328 A | 3/1998 | Mitrsa et al. | 455/69 |
| 5,790,955 A | * 8/1998 | Tomoike | 455/453 |
| 5,859,836 A | 1/1999 | Eslambolchi | 370/222 |
| 5,970,403 A | * 10/1999 | Alperovich et al. | 455/453 |
| 6,256,490 B1 | * 7/2001 | Yost et al. | 455/67.7 |
| 6,266,531 B1 | * 7/2001 | Zadeh et al. | 455/453 |

FOREIGN PATENT DOCUMENTS

| | | | |
|---|---|---|---|
| GB | 2316578 | 2/1998 | H04Q/7/36 |
| WO | 98/52288 | 11/1998 | H04B/1/00 |

OTHER PUBLICATIONS

"Erlang Capacity of a Power Controlled CDMA System," IEEE Journal on Selected Areas in Communications, US, IEEE Inc. New York, vol. 11, No. 6, pp. 892–900 Aug. 1993.
"Advanced Management of Telecommunications Networks," Electrical Communication, Be, Alcatel. Brussels, vol. 65, No. 1, 1991, pp. 52–59.

* cited by examiner

Primary Examiner—William Trost
Assistant Examiner—Rafael Perez-Gutierrez
(74) Attorney, Agent, or Firm—Dickstein, Shapiro, Morin & Oshinsky

(57) ABSTRACT

A computer implemented method and apparatus for determining if a wireless telecommunication system is operating at a reduced capacity is provided. The method and apparatus utilize call processing information associated with every sector/carrier within a CDMA base station to determine if any sector/carrier is operating at a reduced capacity while also being limited by power control (i.e., power control is blocking new users from gaining access to the sector/carrier even though the sector/carrier is operating at a reduced capacity). Thus, the method and apparatus detect blocking faults affecting the capacity of the CDMA system.

54 Claims, 5 Drawing Sheets

METHOD AND APPARATUS FOR THE DETECTION OF A REDUCTION IN CAPACITY OF A CDMA SYSTEM

BACKGROUND OF THE INVENTION

1. Field of the Invention

The present invention relates generally to the field of telecommunications and, more particularly to a method and apparatus for detecting a reduction in capacity of a CDMA system.

2. Description of the Related Art

FIG. 1 illustrates a schematic diagram of a portion of a typical wireless telecommunications system 100. The system 100 provides wireless communication service to a number of wireless terminals 101-1, 101-2, 101-3 that are situated within a graphical region. The heart of a typical wireless telecommunications system 100 is the Wireless Switching Center (WSC) 120, which may also be known as a Mobile Switching Center (MSC) or Mobile Telephone Switching Office (MTSO). Typically, the WSC 120 is connected to a plurality of base stations 103-1, 103-2, 103-3, 103-4, 103-5 that are dispersed throughout the geographic area serviced by the system 100 and to local-offices (L.O.) 130, 138 and toll offices (T.O.) 140. The WSC 120 is responsible for, among other things, establishing and maintaining calls between wireless terminals and between a wireless terminal and a wireline terminal 150, which is connected to the system through local and/or long distance networks.

The geographic area serviced by the system 100 is partitioned into a number of spatially distinct areas called "cells". In FIG. 1 each cell is schematically represented by a hexagon; in practice, however, each cell usually has an irregular shape that depends on the topology of the terrain serviced by the system 100. Typically, each cell contains a base station, such as for example base station 103-1, which includes the radios and antennas that the base station uses to communicate with the wireless terminals in that cell and also comprises the transmission equipment that the base station uses to communicate with the WSC 120.

For example, when wireless terminal 101-1 desires to communicate with wireless terminal 101-2, wireless terminal 101-1 transmits the desired information to base station 103-1, which relays the information to WSC 120. Upon receipt of the information, and with the knowledge that the information is intended for wireless terminal 101-2, the WSC 120 returns the information back to base station 103-1, which relays the information to the wireless terminal 101-2.

In a CDMA wireless telecommunications system a base station process commonly referred to as "power control" regulates the transmitting power of wireless terminals communicating with the base station. This power control process ensures that all wireless terminals communicating with the base station have roughly the same power level at the base station to prevent unwanted signal interference and noise. The power control process determines the power level of each wireless terminal communicating with the base station and transmits messages to each wireless terminal indicating whether its power level should be increased, decreased, or remain the same.

The power control process also regulates the number of users that a cell can support at any one time. Analog and TDMA wireless telecommunications systems have a predetermined or "hard limit" number of users per channel. CDMA systems, however, do not have such a hard limit. The only limit to the number of users a CDMA cell can handle (i.e., its capacity) is the amount of noise and interference present within the cell. A CDMA system has a "soft" capacity limit because the noise and interference can vary.

Since a CDMA wideband channel is reused in every cell, self interference caused by other users of the same cell and interference caused by users in other cells is the most limiting factor to the capacity of the cell and thus, the CDMA system. Due to fading and other channel impairments, maximum capacity is achieved when the signal-to-noise ratio (SNR) for every user is, on the average, at the minimum point needed to support an acceptable channel performance. Based on these and other principles, power control determines whether a new user (i.e., wireless terminal) or call can be added to a cell within a system. If power control determines that a new user or call cannot be added to a cell, it prevents the user from gaining access to the cell. The process of preventing a new user from gaining access to a cell is known as blocking.

Ensuring that a CDMA system operates to its full capacity is extremely important for a CDMA service provider in terms of its revenue, customer satisfaction, and reputation. Since the typical CDMA system has a soft capacity limit, it is difficult to determine whether the system is operating up to its full potential because, unlike analog and TDMA systems, there is no hard limit number of users to compare with the CDMA system's current number of users. That is, it is difficult to determine if power control is blocking new users from gaining access to the system when the capacity of the system has not been reached.

This inappropriate blocking, referred to herein as a blocking fault, could be caused by various errors within the system. The CDMA service provider needs to detect these errors as soon as possible since they are affecting the operational capacity of the system. Although the typical CDMA system has error detection capabilities, these capabilities typically focus upon the engineering aspects of the system, such as over temperature problems, but not operational aspects such as a blocking fault resulting in a reduction of capacity (which in a CDMA system is difficult to determine). Thus, there is a desire and need for a mechanism for detecting a reduction in capacity of a CDMA system.

SUMMARY OF THE INVENTION

In view of the foregoing shortcomings, and for other reasons, the present invention is directed to detecting a reduction in capacity of a CDMA wireless telecommunications system. The invention comprises a computer implemented method and apparatus that utilizes call processing information associated with every sector/carrier within a base station to determine if any sector/carrier is operating at a reduced capacity while also being limited by power control (i.e., power control is blocking new users from gaining access to the sector/carrier even though the sector/carrier is operating at a reduced capacity). Thus, the present invention detects faults affecting the capacity of the CDMA system.

In one aspect of the present invention, a method of detecting a reduction in capacity of a telecommunications system is provided. The method includes the steps of: determining a number of calls that have been blocked by a process of the system during a predetermined interval; determining a minimum number of channel elements carrying calls when calls are being blocked by the process during the predetermined interval; comparing the number of calls being blocked to a first threshold; comparing the minimum number of channel elements carrying calls when calls are being blocked to a second threshold; and if the number of calls being blocked exceeds the first threshold and the minimum number of channel elements carrying calls when calls are being blocked is less than the second threshold, providing an indication that the system is operating at a reduced capacity.

In another aspect of the present invention, a wireless communications apparatus is provided. The apparatus includes: a programmed processor for determining a number of calls that have been blocked by a process of the system during a predetermined interval; determining a minimum number of channel elements carrying calls when calls are being blocked by the process during the predetermined interval; comparing the number of calls being blocked to a first threshold; comparing the minimum number of channel elements carrying calls when calls are being blocked to a second threshold; and if the number of calls being blocked exceeds the first threshold and the minimum number of channel elements carrying calls when calls are being blocked is less than the second threshold, for providing an indication that the system is operating at a reduced capacity.

In yet another aspect of the present invention, a test system is provided. The system includes: a test apparatus; and a base station connected to said test apparatus, said base station having a programmed processor for determining a number of calls that have been blocked by a process of the telecommunications system during a predetermined interval; determining a minimum number of channel elements carrying calls when calls are being blocked by the process during the predetermined interval; comparing the number of calls being blocked to a first threshold; comparing the minimum number. of channel elements carrying calls when calls are being blocked to a second threshold; and if the number of calls being blocked exceeds the first threshold and the minimum number of channel elements carrying calls when calls are being blocked is less than the second threshold, for providing an indication to the test apparatus that the telecommunications system is operating at a reduced capacity.

It is an object of the present invention is to provide an apparatus for detecting a reduction in capacity of a wireless telecommunications system.

It is another object of the invention to provide an apparatus for providing a fault indication whenever a portion of a wireless system is operating at a reduced capacity.

It is a further object of the present invention is to provide a method for detecting a reduction in capacity of a wireless telecommunications system.

It is yet another object of the invention to provide a method that provides a fault indication whenever a portion of a wireless system is operating at a reduced capacity.

BRIEF DESCRIPTION OF THE DRAWINGS

The foregoing and other advantages and features of the invention will become more apparent from the detailed description of the preferred embodiments of the invention given below with reference to the accompanying drawings in which:

FIG. 2 is a block diagram illustrating a base station used in a CDMA wireless telecommunications system in which a method of the present invention is to be operated on;

DETAILED DESCRIPTION OF PREFERRED EMBODIMENTS

The present invention is directed to a computer implemented method and apparatus for detecting a reduction in capacity of a CDMA system, primarily caused by blocking faults. The method and apparatus utilize call processing information associated with every sector/carrier within a CDMA base station to determine if any sector/carrier is operating at a reduced capacity while also being limited by power control (i.e., power control is blocking new users from gaining access to the sector/carrier even though the sector/carrier is operating at a reduced capacity). Thus, the present invention detects faults effecting the capacity of the CDMA system. The present invention also has the capability of providing a fault indication whenever a portion of a wireless system is operating at a reduced capacity.

Figure 1:
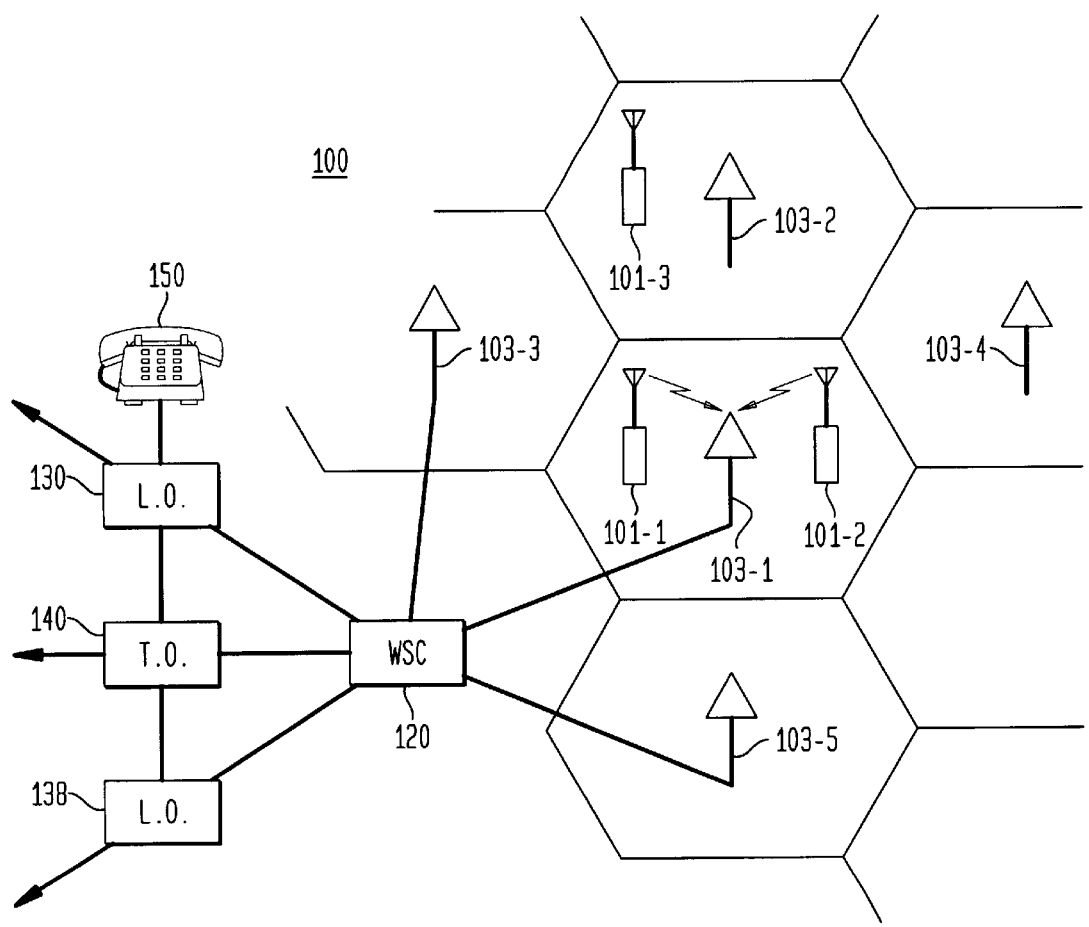
FIG. 1 is a schematic diagram illustrating a conventional CDMA wireless telecommunications system.
Figure 2:
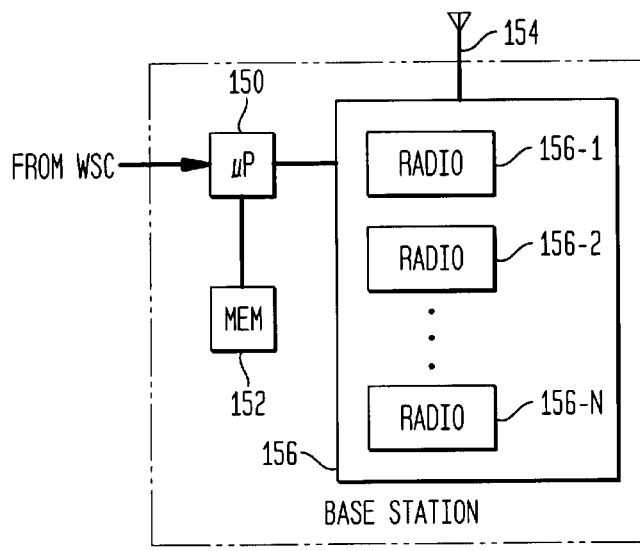

The present invention is implemented in software and is to be executed within each base station of a CDMA system. FIG. 2 illustrates an exemplary base station. The base station includes at least one microprocessor 150, memory circuit 152, antenna 154, and radio module 156 connected in the conventional manner. It should be appreciated that a base station may contain numerous microprocessors, but only one microprocessor 150 is illustrated. Moreover, the exact architecture of the base station is not important as along as it can implement the method of the present invention (discussed below). The radio module 156 contains a plurality of radios 156-1, 156-2, . . . ,156-n. As known in the art, the microprocessor 150 is coupled to the memory 152, radio module 156 and is in communication with the WSC. As is also known in the art, the micro-processor 150 controls and coordinates the operations of the base station including, but not limited to, the call processing and power control functions while also communicating with the WSC. With the provision of some additional software, the micro-processor 150 will also implement the method of the present invention (described below with reference to FIGS. 3a–3d).

FIGS. 3a–3d illustrate an exemplary method 300 of detecting a reduction in capacity of a wireless telecommunications system in accordance with an embodiment of the present invention. One feature of the present invention is a "capacity test" that provides a fault indication for any sector/carrier, that communicates with the WSC, operating at a reduced capacity that is also being limited by power control (i.e., a blocking fault). Prior to discussing the method 300 and its capacity test, the following background information is provided. As is conventionally known in the art, cells can consist of a single omni-directional antenna or they can contain numerous individual directional antennas, which when combined cover the geographical area of the cell. Each directional antenna transmits and receives energy within a specified area of the cell. This area is commonly referred to as a sector. Thus, a cell can be divided into several sectors. Depending upon the bandwidth allocated to each sector (or the cell if it is not split into sectors), each sector can have numerous carriers or individual slices of bandwidth. That is, for example, if sector has ten carriers and a cell has three sectors, then the cell has 30 individual sector/carriers capable of handling a bandwidth of wireless users. Accordingly, the present invention determines whether each sector/carrier within a CDMA system is performing up to its expected capacity.

Capacity can be determined by the number of channel elements (CEs) within a sector/carrier that are currently in use (i.e., processing a user's call). For each sector/carrier there will be a plurality of channel elements, each channel element capable of handling one call. As will be discussed below, the call processing function of the base station will keep track of the number of CEs in use for a sector/carrier, while also maintaining blocking information (e.g., minimum and maximum number of CEs blocked by power control) pertinent to the present invention. It should be noted that capacity can be affected by a user's vocoder mode, which sets the quality of voice service for the user's mobile terminal. In addition, a channel element does not have to be permanently associated with a sector, but it can be shifted from sector to sector if needed. This technique is known as channel pooling.

Referring again to FIGS. 3a–3d, the method 300 begins by inputting call processing information from the call processing process of the base station (step 302). This call processing information will contain, but is not limited to, the following information for each sector/carrier of the base station:

(a) the number of call originations and terminations that are blocked by power control (NUM_BLOCK);

(b) the maximum number of channel elements (CEs) carrying calls when a call origination or termination was blocked by power control (MAX_BLOCK);

(c) the minimum number of CEs carrying calls when a call origination or termination was blocked by power control (MIN_BLOCK); and (d) the maximum number of CEs carrying calls when a call origination or termination was made, but not blocked by power control (MAX_CLEAR).

Call processing will update this information on a per sector/carrier basis during its normal operating process. The results may be stored in a special area of memory, which is accessible by the method 300 of the present invention. One way for call processing to set MAX_BLOCK and MIN_BLOCK is to sense the number of CEs carrying calls each time a call attempt (or termination) is blocked and store the maximum and minimum of this number. One way for call processing to set MAX_CLEAR is to sense the number of CEs carrying calls each time a call attempt is made and not blocked, and to store the maximum of this number. The number of CEs carrying calls refers to the number of CEs carrying traffic channels, whether as the primary CE or as a secondary CE in a soft handoff. In addition, call processing can determine if a sector/carrier has no more capacity while another carrier does and thus, a count could be recorded in NUM_BLOCK from an interaction in which the wireless terminal receives service (on a different sector/carrier).

At step 304, the input call processing information NUM_BLOCK, MAX_BLOCK, MIN_BLOCK, and MAX_CLEAR is stored and used to update capacity test information maintained by the method 300. The method 300 will include a database or table of capacity test information, on per sector/carrier basis, that includes the input call processing information as well as capacity test information (described below). The call processing information NUM_BLOCK, MAX_BLOCK, MIN_BLOCK, and MAX_CLEAR is then reset to zero at the call processing function (step 306).

At step 308 it is determined whether the capacity test feature of the present invention is enabled. As will be discussed below with reference to FIG. 4, the method of the present invention may be controlled by an operator at the WSC or the base station, for example, and one of the available controls will be to allow the operator to enable or disable the capacity test feature of method 300. If the test feature is not enabled the method 300 will gather the call processing information NUM_BLOCK, MAX_BLOCK, MIN_BLOCK, and MAX_CLEAR and maintain portions of the capacity test information without analyzing the information to determine if there was a fault. This would be useful, among other things, for determining thresholds for the test (described below).

If at step 308 it is determined that the capacity test is not enabled, the method 300 continues at step 370 where it is determined if an operator of the WSC has requested or demanded the issuance of a demand report. A demand report issued when the capacity test is not enabled (i.e., inhibited) will contain the current status of each sector/carrier, or a selected number of sector/carriers and may also contain minimum and maximum values of the call processing information NUM_BLOCK, MAX_BLOCK, MIN_BLOCK, and MAX_CLEAR as well as date and time information concerning the period over which the information was gathered. It should be noted that the information provided in the demand report is user dependent and may vary based on the preference of the operator. It should also be noted that there can be a demand report containing information gathered while the capacity test is inhibited and a demand report containing information gathered while the test is enabled (discussed with reference to steps 321 and 341). If at step 370 it is determined if a demand report should be issued, the report is issued (step 372). The demand report information will be cleared upon a request from the operator, otherwise the information is not cleared (step 374). It is also desirable for an operator of the WSC to use the demand report information to adjust the thresholds of the capacity (i.e., the thresholds should be lowered to detect more faults). As will be discussed with reference to FIG. 4, the report may be displayed on a status display page (SDP) at a computer workstation or printed out on a read-only printer (ROP). At this point, or if at step 370 it is determined if a demand report should not be issued, the method 300 terminates. It is desirable for the test information to be maintained and that the method be rerun periodically, e.g., every five minutes, to effectively monitor the CDMA system.

If at step 308 it is determined that the capacity test is enabled, the method 300 continues at step 310 where a sector index or pointer is set to the first sector to be tested. At step 312 a carrier index or pointer is set to the first carrier associated with the first sector. It should be appreciated that it maybe that the CDMA cell is not be split into sectors. A default sector number, one for example, could be used as the sector index or pointer in such a situation. At step 314, the test information associated with the current sector/carrier (i.e., the sector/carrier pointed to by the sector index and the carrier index) is retrieved from the test information database.

Figure 3A:
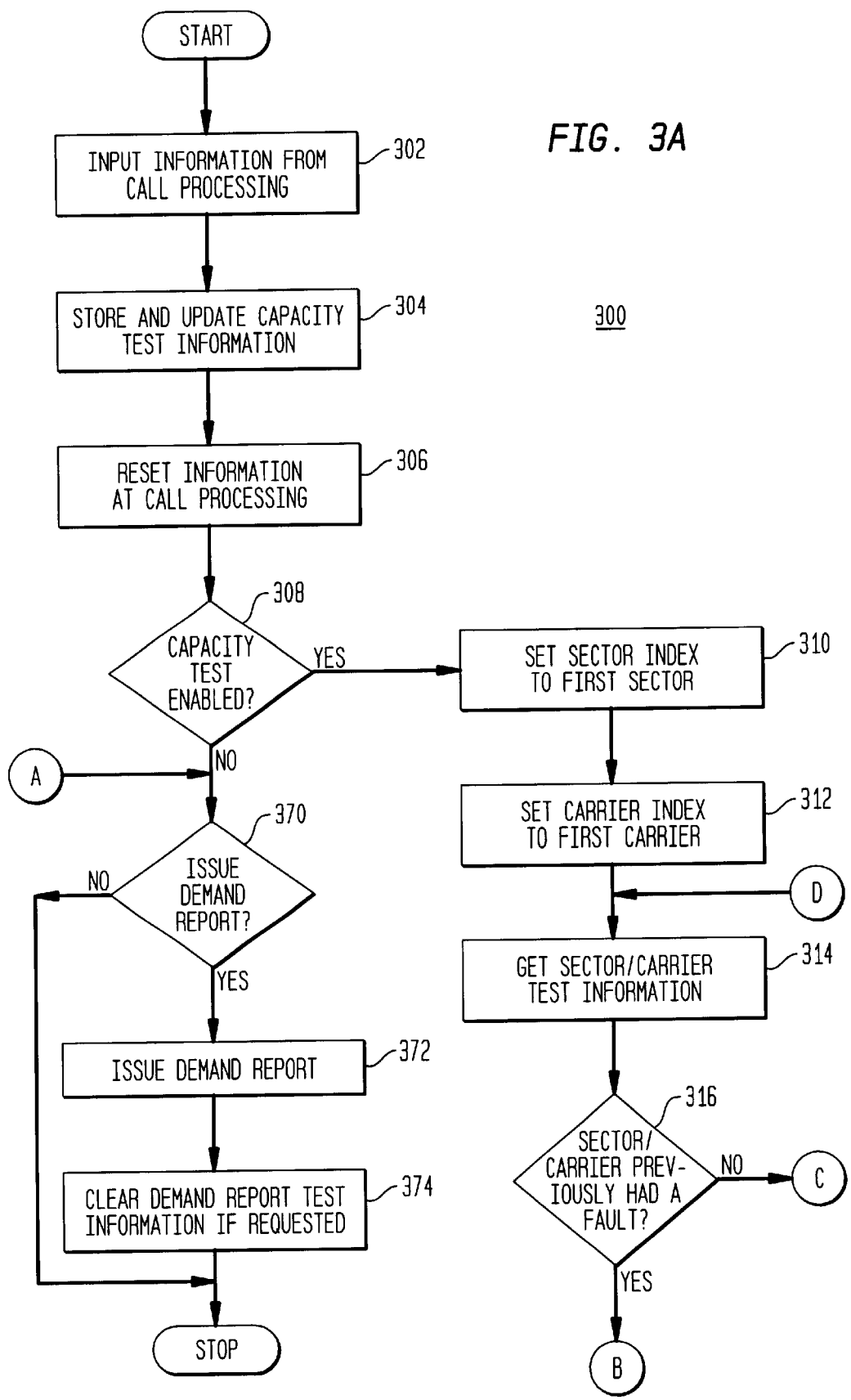
FIGS. 3a–3d are flowcharts illustrating an exemplary method of detecting a reduction in capacity of a wireless telecommunications system in accordance with an embodiment of the present invention.
Figure 3B:
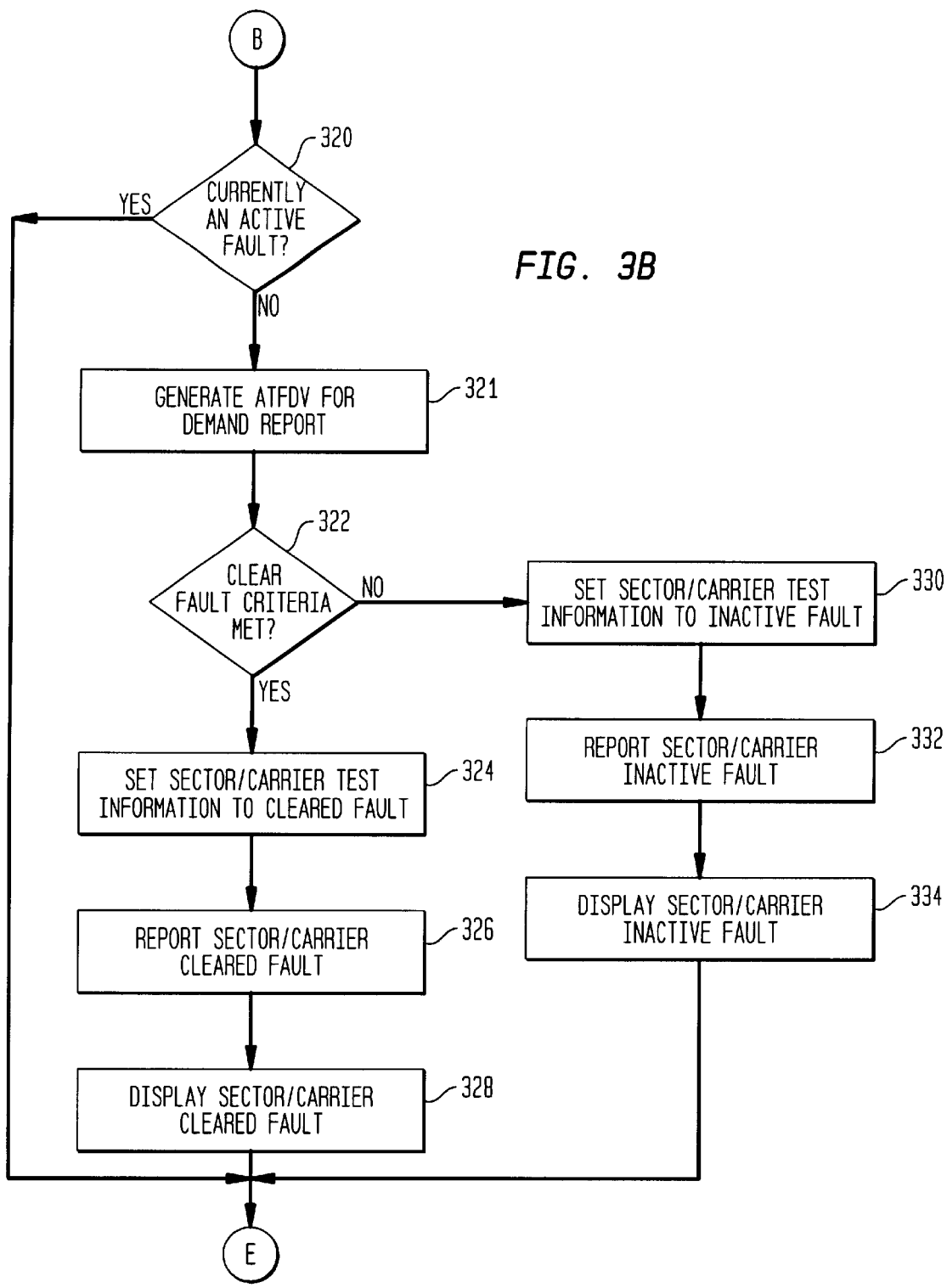
Figure 3C:
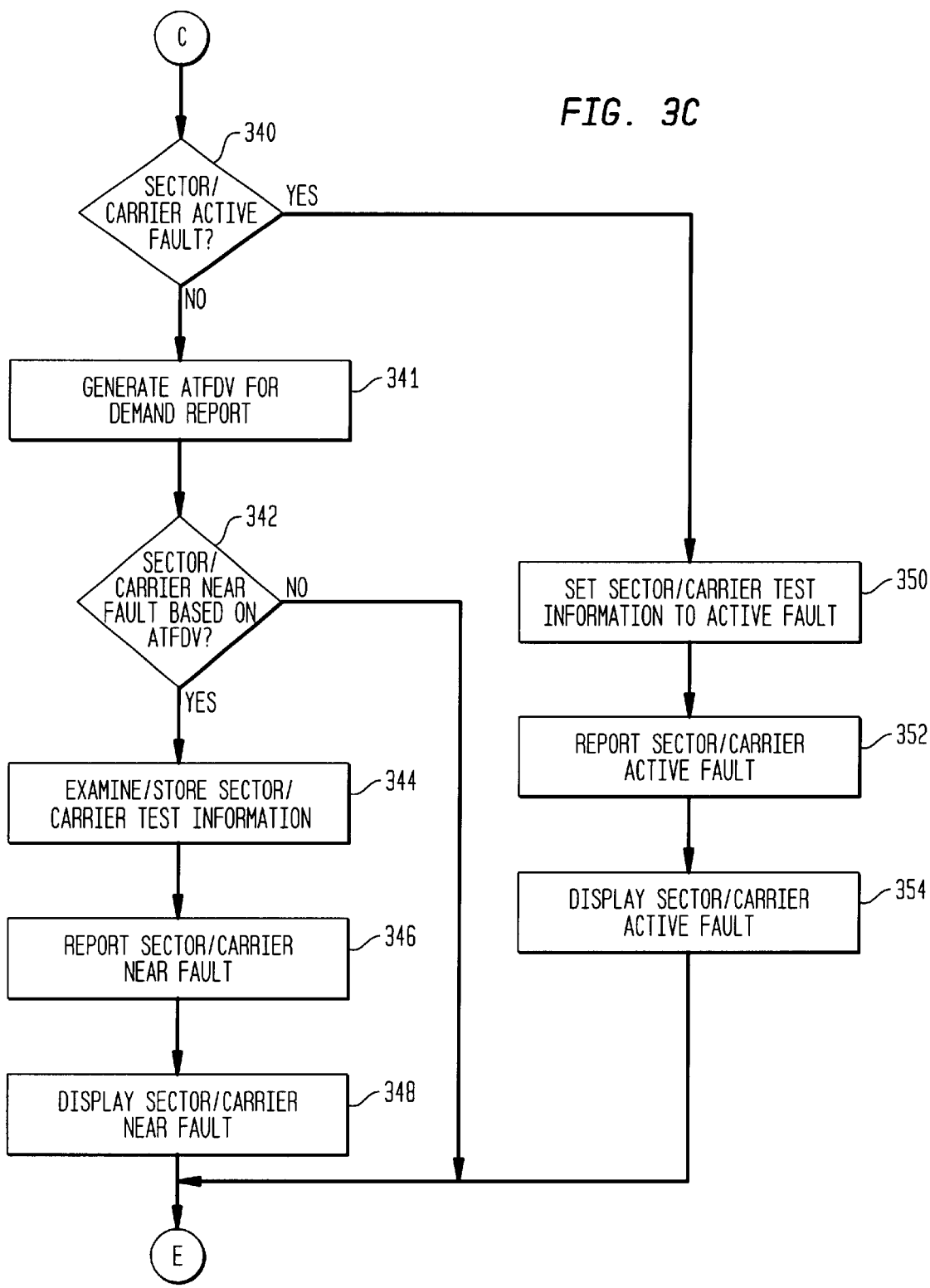
Figure 3D:
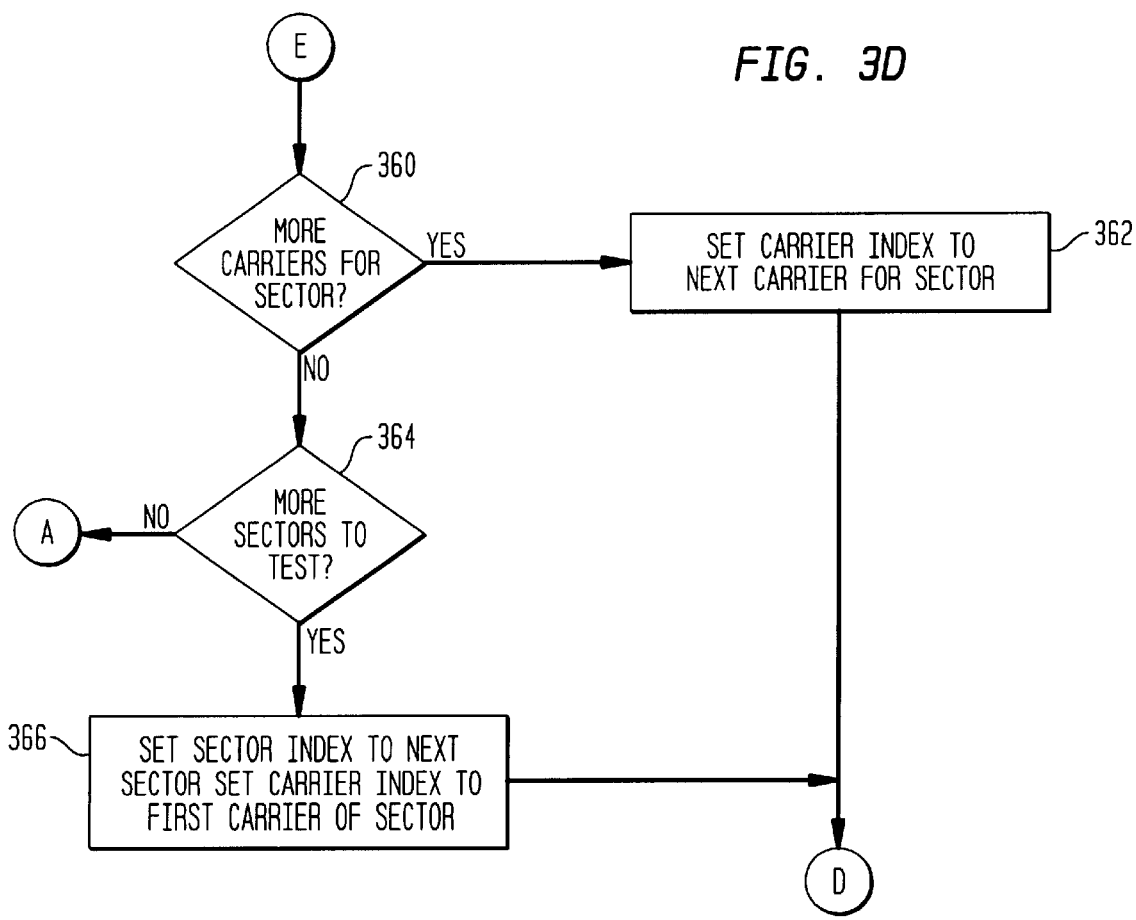

At step 316, it is determined if the current sector/carrier had a fault in the immediately preceding test performed by the method 300. That is, did the method 300 determine that the sector/carrier had an active or inactive fault the last time the sector carrier was tested. If at step 316 it is determined that the sector/carrier did not have a fault in the immediately preceding test, the method 300 continues at step 340 (FIG. 3c). As will be described in more detail below, the method 300 of the present assigns one of three fault states to each sector/carrier. The first fault state is the "cleared" state indicating that the sector/carrier does not currently have a capacity fault and thus, is not operating at a reduced capacity. It is desirable that each sector/carrier is in the cleared state. The second fault state is the "active fault" state indicating that the sector/carrier is operating at a reduced capacity and calls are currently being blocked by power control. Thus, an active fault state indicates that there has been a blocking fault on this sector/carrier. The third state is the "inactive fault" state that indicates that the criteria for declaring an active fault is no longer met, yet the criteria for clearing the fault (and entering the cleared state) is also not met.

At step 340, it is determined from the call processing information NUM_BLOCK, MAX_BLOCK, MIN_BLOCK, and MAX_CLEAR whether the sector/carrier currently has an active fault. To declare that the sector/carrier has an active fault, the following must be satisfied.

(1) NUM_BLOCK>0, and
(2) (MIN_BLOCK-THRESH_CE)<(VAR_THRESH)/$\sqrt{\text{NUM\_BLOCK}}$, where THRESH_CE represents the threshold number of blocked calling elements required to declare an active fault and VAR_THRESH is the allowable variation in THRESH_CE, if any. Both THRESH_CE and VAR_THRESH will initially be based upon the CDMA system design, but as will be discussed below, they may be altered by an operator based on system performance and the results of the method 300. It must be noted that if calls are not being blocked (i.e., NUM_BLOCK=0) then there is no active fault even if the sector/carrier is operating at a relatively low capacity because dynamic power control is not preventing call originations or terminations.

If at step 340 it is determined that the sector/carrier has an active fault, the method continues at step 350 where the test information for the sector/carrier is updated to place the sector/carrier into the active fault state. At step 352 the sector/carrier active fault and additional test information may be reported to an operator of the system, while at step 354 the sector/carrier active fault and additional test information may be displayed to an operator of the system. These steps are optional, but at least one of these steps should be taken to ensure that an operator becomes aware that there has been a sector/carrier active fault.

Figure 4:
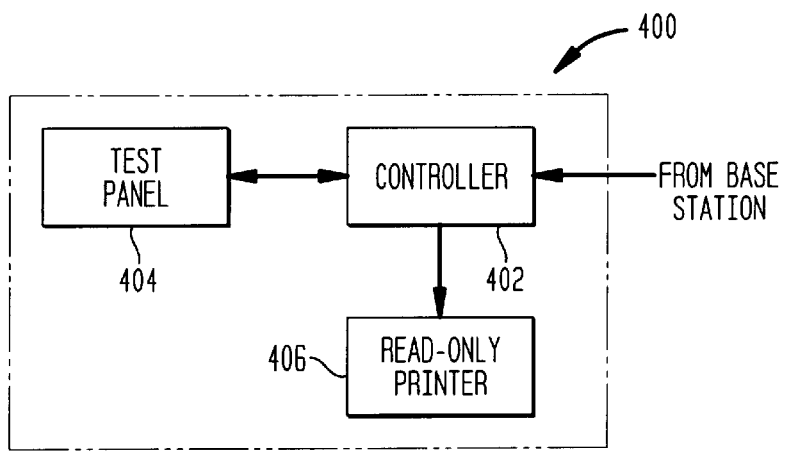
FIG. 4 is a block diagram of an apparatus suitable for displaying and outputting information provided by the method illustrated in FIGS. 3a–3d.

An exemplary apparatus 400 suitable for displaying and outputting the information provided at steps 352 and 354 is illustrated in FIG. 4. The apparatus 400, which may be located at the WSC, or any location within or without the CDMA system, is coupled to the base station executing the method of the present invention. he apparatus 400 includes a controller 402, which may be, for example, a microprocessor or an application specific integrated circuit (ASIC). The controller 402 may be connected to a read-only printer (ROP) 406, which provides a print-out or hard copy of the information received from the method of the present invention. In addition, the controller 402 may be connected to a test panel 404 having a display for providing a status display of the information received from the method of the present invention. In addition, the test panel 404, which may be a computer workstation, will include input/output (I/O) devices, such as a keyboard, mouse, or touch panel, allowing an operator of the apparatus to adjust thresholds, such as THRESH_CE, system settings, and test options, used by the method of the present invention. The apparatus, whether implemented as part of the test panel 404 or as a separate component, should have an indication, such as a light or audible indication, to alert an operator that there has been a fault on one of the sector/carriers. It should be apparent, that the exact configuration of the apparatus 400 is not important so long as there is a mechanism for receiving and outputting the information received from the method of the present invention.

Referring again to FIGS. 3a–3d, upon the completion of step 354, the method 300 continues at step 360 (FIG. 3d),to determine if there are more carriers to be tested for the current sector. If at step 360 it is determined that there are more carriers to be tested for the current sector, the carrier index is set to the next carrier for the current sector (step 362) and the method 300 continues at step 314 (FIG. 3a), where the new sector/carrier is tested (as described above). If at step 360 it is determined that there are no more carriers to be tested for the current sector, it is determined at step 364 whether there are more sectors to be tested.

If at step 364 it is determined that there are no more sectors to be tested, the method continues at step 370 (FIG. 3a), to see if an operator of the WSC has requested that a demand report be issued. This demand report will contain information gathered during the capacity test. The information contained in the demand report will be referred to herein as ATFDV (attempted fault detection variables) information (described below with reference to step 341). If at step 364 it is determined that there are more sectors to be tested, the sector index is set to the next sector to be tested, the carrier index is set to the first carrier for the current sector (step 366) and the method 300 continues at step 314 (FIG. 3a), where the new sector/carrier is tested (as described above).

If at step 340 it is determined that the sector/carrier does not have an active fault, the method continues at step 341 where the ATFDV information is gathered for a future demand report. The ATFDV information may contain the current status of each sector/carrier, or a selected number of sector/carriers and may also contain minimum and maximum values of the call processing information NUM_BLOCK, MAX_BLOCK, MIN_BLOCK, and MAX_CLEAR as well as date and time information concerning the period over which the information was gathered. Any data useful to the WSC operator may be included in the demand report. At step 342 where it is determined from the ATFDV information if the sector/carrier has had a "near fault." A near fault occurs when the ATFDV information of the sector/carrier has not met the criteria for declaring an active fault (i.e., entering the active fault state), but has come within a small percentage of meeting the active fault criteria. That is, the method 300 has not declared a fault, but the sector/carrier information is within a specified range of the fault criteria (i.e., near fault) that the test information should be monitored. The monitoring of near fault information may be useful in determining future thresholds. It is desirable to report a sector/carrier near fault when the ATFDV information comes within twenty per-cent of the active fault threshold for a sector/carrier although any percentage could be chosen by the operator. It is also desirable for an operator of the WSC to use the near fault information to raise the thresholds since they are most likely too low and thus, too many errors are being reported.

If at step 342 it is determined that a sector/carrier near fault has not occurred, the method 300 continues at step 360 (described above). If at step 342 it is determined that a sector/carrier near fault has occurred, the method 300 continues at step 344 where the current test information is examined to determine if the quantity being examined, such as NUM_BLOCK, is one of the three highest for that sector/carrier. If it is, then it is stored as part of the three highest quantities in the near fault information (part of the overall test information database) for that sector/carrier. It should be noted that any number of quantities could be stored in the near fault information and that the invention is not to be limited to three. In addition, any test information including the call processing information NUM_BLOCK, MAX_BLOCK, MIN_BLOCK, and MAX_CLEAR could also be examined and stored at step 344. At step 346 the sector/carrier near fault and near fault information may be reported to an operator of the system, while at step 348 the sector/carrier near fault and near fault information may be displayed to an operator of the system. These steps are optional, but at least one of these steps should be taken to ensure that an operator becomes aware that there has been a sector/carrier near fault. At this point, the method 300 continues at step 360 (described above).

If at step 316 it is determined that the sector/carrier had a fault in the immediately preceding test, the method 300 continues at step 320 to determine if the fault is currently an active fault. To determine whether the sector/carrier fault is an active fault, the following must be satisfied (as described above with reference to step 340):

(3) NUM_BLOCK>0, and (4) (MIN_BLOCK-THRESH_CE)<(VAR_THRESH)/√NUM_BLOCK.

If the sector/carrier fault is active, the method 300 continues at step 360 (described above). There is no need to report the fault since it has already been reported. Of course, the fault can be reported again if so desired. If it is determined that there is no sector/carrier active fault, that is, the criteria for declaring an active fault is not met, the method 300 continues at step 321 where the ATFDV information is gathered for a future demand report. At step 322 it is determined if the sector/carrier can be placed into the cleared fault state. To determine whether the sector/carrier can be placed into the cleared fault state, the following must be satisfied:

(5) MAX_CLEAR<CLEAR_FAULT, and (6) NUM_BLOCK=0 or MAX_BLOCK>CLEAR_FAULT, where CLEAR_FAULT is the number of CEs required to clear a fault.

If at step 322, it is determine that the sector/carrier can be placed into the cleared fault state, the method 300 continues at step 324 where the test information for the sector/carrier is updated to place the sector/carrier into the cleared fault state. At step 326 the sector/carrier cleared fault state and additional test information may be reported to an operator of the system, while at step 328 the sector/carrier cleared fault state and additional test information may be displayed to an operator of the system. These steps are optional, but at least one of these steps should be taken to ensure that an operator becomes aware that any sector/carrier fault has been cleared for the current sector/carrier.

If at step 322, it is determine that the sector/carrier cannot be placed into the cleared fault state, the method 300 continues at step 330 where the test information for the sector/carrier is updated to place the sector/carrier into the inactive fault state. At step 332 the sector/carrier inactive fault state and additional test information may be reported to an operator of the system, while at step 334 the sector/carrier inactive fault state and additional test information may be displayed to an operator of the system. These steps are optional, but at least one of these steps should be taken to ensure that an operator becomes aware that there has been a sector/carrier inactive fault.

Thus, the present invention is capable of detecting when a sector/carrier of a CDMA system is operating at a reduced capacity while it is also being limited by power control (an active or blocking fault). Moreover, the present invention provides a means for reporting the fault, whether be by an audible or visual alarm/indicator, so that an operator may act quickly to cure the cause of the fault.

It must be noted that the present invention may be implemented in software or a combination of hardware and software. The invention may be implemented in any conventional CDMA base station and is not restricted to any particular CDMA system architecture.

While the invention has been described in detail in connection with the preferred embodiments known at the time, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by letters patent of the united states is:

1. A method of detecting a reduction in capacity of a telecommunications system, the system comprising at least one sector, each sector comprising at least one carrier, said method comprises:

determining a number of calls that have been blocked by a process of the system during a predetermined interval for each sector;

determining a minimum number of channel elements carrying calls when calls are being blocked by the process during the predetermined interval for each sector;

comparing the number of calls being blocked for each sector to a first threshold;

comparing the minimum number of channel elements carrying calls when calls are being blocked for each sector to a second threshold; and if the number of calls being blocked exceeds the first threshold and the minimum number of channel elements carrying calls when calls are being blocked is less than the second threshold for a sector, providing an indication that the sector is operating at a reduced capacity.

2. A method of detecting a reduction in capacity of a telecommunications system, comprising the steps of:

determining a number of calls that have been blocked by a process of the system during a predetermined interval;

determining a minimum number of channel elements carrying calls when calls are being blocked by the process during the predetermined interval;

comparing the number of calls being blocked to a first threshold;

comparing the minimum number of channel elements carrying calls when calls are being blocked to a second threshold; and if the number of calls being blocked exceeds the first threshold and the minimum number of channel elements carrying calls when calls are being blocked is less than the second threshold, providing an indication that the system is operating at a reduced capacity.

3. The method of claim 2 wherein said step of comparing the minimum number of channel elements carrying calls when calls are being blocked to a second threshold comprises:

taking the difference between the second threshold and the minimum number of channel elements; and comparing the difference to a third threshold.

4. The method of claim 2 wherein a report is printed if the number of calls being blocked exceeds the first threshold and the minimum number of channel elements carrying calls when calls are being blocked is more than the second threshold, but within a predetermined amount of the second threshold.

5. The method of claim 4 wherein the printed report is used to adjust at least one of the thresholds.

6. The method of claim 2 wherein said step of providing an indication that the system is operating at a reduced capacity comprises activating a visible indicator.

7. The method of claim 2 wherein said step of providing an indication that the system is operating at a reduced capacity comprises displaying information to a user.

8. The method of claim 2 further comprising the step of storing a first indicator in a computer readable medium if the system is operating at a reduced capacity.

9. The method of claim 8 further comprising the steps of:
determining a second number of calls that have been blocked by a process of the system during a second predetermined interval;
determining a second minimum number of channel elements carrying calls when calls are being blocked by the process during the second predetermined interval;
determining from information stored in the computer readable medium if there is a first indicator;
if there is a first indicator, determining from the second number of calls and the second minimum number of channels elements if the first indicator can be cleared; and
if the first indicator can be cleared, providing a second indication that the system is no longer operating at a reduced capacity.

10. The method of claim 9 further comprising the step of storing a second indicator in the computer readable medium if the system is no longer operating at a reduced capacity.

11. The method of claim 9 wherein if the first indicator cannot be cleared, providing a third indication that the system is in an intermediate state.

12. The method of claim 11 further comprising the step of storing a third indicator in the computer readable medium if the system is in an intermediate state.

13. The method of claim 2 wherein said step of providing an indication that the system is operating at a reduced capacity comprises activating an audible alarm.

14. The method of claim 2 wherein said step of providing an indication that the system is operating at a reduced capacity comprises printing a report.

15. The method of claim 14 wherein information in the report is used to adjust at least one of the thresholds.

16. The method of claim 2 wherein the process of the system is a power control process.

17. The method of claim 16 wherein said step of determining a number of calls that have been blocked comprises inputting the number of calls that have been blocked from the power control process.

18. The method of claim 16 wherein said step of determining a minimum number of channel elements carrying calls comprises inputting the minimum number of channel elements carrying calls from the power control process.

19. A test system, comprising:
a test apparatus; and
a base station connected to said test apparatus, said base station having a programmed processor for determining a number of calls that have been blocked by a process of a telecommunications system during a predetermined interval; determining a minimum number of channel elements carrying calls when calls are being blocked by the process during the predetermined interval; comparing the number of calls being blocked to a first threshold; comparing the minimum number of channel elements carrying calls when calls are being blocked to a second threshold; and if the number of calls being blocked exceeds the first threshold and the minimum number of channel elements carrying calls when calls are being blocked is less than the second threshold, for providing an indication to the test apparatus that the telecommunications system is operating at a reduced capacity.

20. The test system of claim 19 wherein said processor compares the minimum number of channel elements carrying calls when calls are being blocked to a second threshold by:
taking the difference between the second threshold and the minimum number of channel elements; and
comparing the difference to a third threshold.

21. The system of claim 19 wherein said base station is coupled to a printer and a report is printed by the processor if the number of calls being blocked exceeds the first threshold and the minimum number of channel elements carrying calls when calls are being blocked is more than the second threshold, but within a predetermined amount of the second threshold.

22. The system of claim 21 wherein the printed report is used by an operator of the test system to adjust at least one of the thresholds.

23. The test system of claim 19 further comprising a computer readable medium, wherein said processor stores a first indicator in said computer readable medium if the telecommunications system is operating at a reduced capacity.

24. The test system of claim 23 wherein said processor is further programmed to:
determine a second number of calls that have been blocked by a process of the telecommunications system during a second predetermined interval;
determine a second minimum number of channel elements carrying calls when calls are being blocked by the process during the second predetermined interval;
determine from information stored in said computer readable medium if there is a first indicator;
if there is a first indicator, determine from the second number of calls and the second minimum number of channels elements if the first indicator can be cleared; and
if the first indicator can be cleared, provide a second indication that the telecommunications system is no longer operating at a reduced capacity.

25. The test system of claim 24 wherein said processor stores a second indicator in said computer readable medium if the telecommunications system is no longer operating at a reduced capacity.

26. The test system of claim 25 wherein said processor stores a third indicator in said computer readable medium if the telecommunications system is in an intermediate state.

27. The test system of claim 24 wherein if the first indicator cannot be cleared, said processor provides a third indication that the telecommunications system is in an intermediate state.

28. The test system of claim 19 wherein said apparatus includes a visible indicator and said processor provides an indication that the telecommunications system is operating at a reduced capacity by activating said visible indicator.

29. The test system of claim 19 wherein said apparatus includes a display and said processor provides an indication that the telecommunications system is operating at a reduced capacity by displaying information on said display.

30. The test system of claim 19 wherein said apparatus includes an audible alarm and said processor provides an indication that the telecommunications system is operating at a reduced capacity by activating said audible alarm.

31. The test system of claim 19 wherein said apparatus includes a printer and said processor provides an indication that the telecommunications system is operating at a reduced capacity by printing a report on said printer.

32. The test system of claim 31 wherein the printed report is used by an operator of the apparatus to adjust at least one of the thresholds.

33. The test system of claim 19 wherein the process of the telecommunications system is a power control process.

34. The test system of claim 33 wherein said processor determines a minimum number of channel elements carrying calls by inputting the minimum number of channel elements carrying calls from the power control process.

35. The test system of claim 33 wherein said processor determines a number of calls that have been blocked by inputting the number of calls that have been blocked from the power control process.

36. The test system of claim 19 wherein the telecommunications system is a CDMA system.

37. A wireless telecommunications apparatus, comprising:
   a programmed processor for determining a number of calls that have been blocked by a process of a system during a predetermined interval; determining a minimum number of channel elements carrying calls when calls are being blocked by the process during the predetermined interval; comparing the number of calls being blocked to a first threshold; comparing the minimum number of channel elements carrying calls when calls are being blocked to a second threshold; and if the number of calls being blocked exceeds the first threshold and the minimum number of channel elements carrying calls when calls are being blocked is less than the second threshold, for providing an indication that the system is operating at a reduced capacity.

38. The apparatus of claim 37 wherein said apparatus is coupled to a printer and a report is printed by the processor if the number of calls being blocked exceeds the first threshold and the minimum number of channel elements carrying calls when calls are being blocked is more than the second threshold, but within a predetermined amount of the second threshold.

39. The apparatus of claim 38 wherein the printed report is used by an operator of the apparatus to adjust at least one of the thresholds.

40. The apparatus of claim 37 wherein the process of the system is a power control process.

41. The apparatus of claim 40 wherein said processor compares the minimum number of channel elements carrying calls when calls are being blocked to a second threshold by:
   taking the difference between the second threshold and the minimum number of channel elements; and
   comparing the difference to a third threshold.

42. The apparatus of claim 40 wherein said apparatus is coupled to a visible indicator and said processor provides an indication that the system is operating at a reduced capacity by activating said visible indicator.

43. The apparatus of claim 40 wherein said apparatus is coupled to a display and said processor provides an indication that the system is operating at a reduced capacity by displaying information on said display.

44. The apparatus of claim 40 further comprising a computer readable medium, wherein said processor stores a first indicator in said computer readable medium if the system is operating at a reduced capacity.

45. The apparatus of claim 44 wherein said processor is further programmed to:
   determine a second number of calls that have been blocked by a process of the system during a second predetermined interval;
   determine a second minimum number of channel elements carrying calls when calls are being blocked by the process during the second predetermined interval;
   determine from information stored in said computer readable medium if there is a first indicator;
   if there is a first indicator, determine from the second number of calls and the second minimum number of channels elements if the first indicator can be cleared; and
   if the first indicator can be cleared, provide a second indication that the system is no longer operating at a reduced capacity.

46. The apparatus of claim 45 wherein if the first indicator cannot be cleared, said processor provides a third indication that the system is in an intermediate state.

47. The apparatus of claim 46 wherein said processor stores a third indicator in said computer readable medium if the system is in an intermediate state.

48. The apparatus of claim 45 wherein said processor stores a second indicator in said computer readable medium if the system is no longer operating at a reduced capacity.

49. The apparatus of claim 40 wherein said apparatus is coupled to an audible alarm and said processor provides an indication that the system is operating at a reduced capacity by activating said audible alarm.

50. The apparatus of claim 40 wherein said apparatus is coupled to a printer and said processor provides an indication that the system is operating at a reduced capacity by printing a report on said printer.

51. The apparatus of claim 50 wherein the printed report is used by an operator of the apparatus to adjust at least one of the thresholds.

52. The apparatus of claim 40 wherein said processor determines a number of calls that have been blocked by inputting the number of calls that have been blocked from the power control process.

53. The apparatus of claim 52 wherein said processor determines a minimum number of channel elements carrying calls by inputting the minimum number of channel elements carrying calls from the power control process.

54. The apparatus of claim 37 wherein the system is a CDMA system.

* * * * *